(12) United States Patent
Garg et al.

(10) Patent No.: US 12,007,981 B2
(45) Date of Patent: Jun. 11, 2024

(54) BLOCKCHAIN SELECTIVE WORLD STATE DATABASE

(71) Applicant: International Business Machines Corporation, Armonk, NY (US)

(72) Inventors: Anuj Kumar Garg, Ghaiziabad (IN); Mani Madhukar, Gautam Budh Nagar (IN); Neeraj Kumar Gupta, Gurugram (IN); Vineet Khatri, Sonipat (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/109,442

(22) Filed: Dec. 2, 2020

(65) Prior Publication Data

US 2022/0171763 A1 Jun. 2, 2022

(51) Int. Cl.
*G06F 16/00* (2019.01)
*G06F 16/22* (2019.01)
*G06F 16/23* (2019.01)

(52) U.S. Cl.
CPC .......... *G06F 16/2379* (2019.01); *G06F 16/22* (2019.01)

(58) Field of Classification Search
CPC ...... G06F 16/2379; G06F 16/22; G06F 16/27; G06F 21/604; G06F 16/2365; G06F 21/6218; G06F 21/64; H04L 63/12; H04L 9/50

See application file for complete search history.

(56) References Cited

U.S. PATENT DOCUMENTS

| | | | |
|---|---|---|---|
| 2016/0275162 A1 | 9/2016 | Jeon | |
| 2018/0150835 A1* | 5/2018 | Hunt | .................. G06Q 20/3827 |
| 2018/0189333 A1 | 7/2018 | Childress | |
| 2019/0042620 A1 | 2/2019 | Garagiola | |
| 2019/0146946 A1 | 5/2019 | Zhang | |
| 2019/0220768 A1 | 7/2019 | Li | |
| 2019/0287026 A1 | 9/2019 | Calmon | |
| 2019/0340267 A1 | 11/2019 | Vo | |
| 2019/0354357 A1* | 11/2019 | Gandhi | ................... H04L 67/34 |
| 2020/0034353 A1* | 1/2020 | Innocenti | ................. H04L 9/50 |
| 2020/0090188 A1* | 3/2020 | Wince | ................ G06Q 30/0201 |
| 2020/0119925 A1* | 4/2020 | Wang | ..................... G06Q 20/38 |
| 2020/0142686 A1 | 5/2020 | Cecchetti | |
| 2020/0349194 A1 | 11/2020 | Kundu | |
| 2020/0364273 A1 | 11/2020 | Kwon | |

OTHER PUBLICATIONS

Dasu, et al. "Unchain your blockchain." pp. 16-23 in Proc. Symposium on Foundations and Applications of Blockchain, vol. 1. 2018.

(Continued)

*Primary Examiner* — Dinku W Gebresenbet
(74) *Attorney, Agent, or Firm* — Michael A. Petrocelli (57) ABSTRACT

A processor may receive a smart contract. The processor may generate an entity policy. The entity policy may provide one or more world-state rules associated with a particular entity. The processor may update, responsive to receiving the smart contract, a world-state database of the particular entity. The one or more world-state rules may affect the world-state database of the particular entity differently than the world-state database of a second entity.

17 Claims, 7 Drawing Sheets

(56) References Cited

OTHER PUBLICATIONS

Dinh, et al. "Untangling Blockchain: A Data Processing View of Blockchain Systems," Published Jul. 1, 2018. IEEE Transactions on Knowledge and Data Engineering, vol. 30, No. 7, pp. 1366-1385. https://ieeexplore.ieee.org/document/8246573.

Karlsson, et al.,. "Vegvisir: A Partition-Tolerant Blockchain for the Internet-of-Things." 2018 IEEE 38th International Conference on Distributed Computing Systems (ICDCS), Vienna, 2018, pp. 1150-1158. https://ieeexplore.ieee.org/document/8416377.

Mell, et al., "The NIST Definition of Cloud Computing," Recommendations of the National Institute of Standards and Technology, U.S. Department of Commerce, Special Publication 800-145, Sep. 2011, 7 pgs.

Palm, et al., "Selective Blockchain Transaction Pruning and State Derivability." Published Jun. 2018. 11 pages. Conference: 2018 Crypto Valley Conference on Blockchain Technology (CVCBT). Published by ResearchGate. <https://www.researchgate.net/publication/328815294_Selective_Blockchain_Transaction_Pruning_and_State_Derivability>.

Sarr, et al., "Blockchain-based Model for Social Transactions Processing." Published Jul. 2015. In Proceedings of 4th International Conference on Data Management Technologies and Applications (Data-2015), pp. 309-315. https://doi.org/10.5220/0005519503090315.

Yu, et al., "Survey: Sharding in Blockchains." Published Jan. 9, 2020. 27 pages. IEEE Access, vol. 8, pp. 14155-14181. Published by IEEE Explore. <https://ieeexplore.ieee.org/document/8954616>.

Combined Search and Examination Report, United Kingdom Application No. 2116548.5, Mailed May 23, 2022, 11 pages.

Garg, et al., "Blockchain Selective World State Database", Germany Application No. 210 2021 130 811.9, Filed Nov. 24, 2021, 91 pages.

Garg, et al., "Blockchain Selective World State Database", United Kingdom Application No. 2116548.5, Filed Nov. 17, 2021, 40 pages.

\* cited by examiner

BLOCKCHAIN SELECTIVE WORLD STATE DATABASE

BACKGROUND

The present disclosure relates generally to the field of blockchain storage, and more particularly to increasing the efficiency of blockchain networks by minimizing the type of information stored.

As blockchain networks gain popularity, so too has the need to scale these blockchain networks to accommodate the increase in the blockchain network's use. When blockchain network use requires databases to expand, blockchain operations can become highly complex and inefficient. As such, identifying potential methods associated with minimizing utilized storage space, while ensuring the blockchain network still functions as intended, is critical.

SUMMARY

Embodiments of the present disclosure include a method, system, and computer program product to selectively update a world-state database of one or more particular entities of a blockchain network. A processor may receive a smart contract. The processor may generate an entity policy. The entity policy may provide one or more world-state rules associated with a particular entity. The processor may update, responsive to receiving the smart contract, a world-state database of the particular entity. The one or more world-state rules may affect the world-state database of the particular entity differently than the world-state database of a second entity.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to blockchain storage, and more particularly to the optimizing storage within the blockchain network. Optimizing storage within the blockchain network can minimize the number of and need for large databases. Database size can grow significantly over a period of time as a result of a blockchain processing heavy transactions (e.g., transactions associated with the financial sector) and updating the various world-state databases to accommodate those heavy transactions. As a result, the various operations associated with the blockchain network can become complex and cause a decrease in blockchain efficiency. As such, data storage management and how it affects efficiency has become a key area of interest in blockchain networks.

The various systems and methods disclosed herein provide embodiments that reduce the number of, and need for, large databases by selectively updating the world state of one or more entities (e.g., organizations). For example, in traditional blockchain networks, all nodes (e.g., endorser and committer nodes) within an entity store the same data (e.g., world-state database data) regardless of whether the information stored in each node is relevant to the entity or not. In addition, some world-state databases associated with the entity traditionally store data that are unnecessary or data that is rarely used by the entity or accessed by the entity.

While attempts have been made to address these aforementioned concerns, such attempts have required entities to hide certain data/information in the form of a private-state database. In some configurations, the use of private-state databases cannot only reduce blockchain usability, but can also erode trust within the blockchain network because participating entities have to hide certain information. Hiding information within a blockchain network can result in a plurality of problems including, but not limited to reducing trust among entities participating in the blockchain network and inconsistencies in data and state information stored within the blockchain. As such, embodiments discussed herein may reduce data/information stored within one or more entities (e.g., world-state database data/information that is not relevant to the entity) while ensuring no data/information within the blockchain network is lost and trust is maintained.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Detailed herein is a method, system, and computer program product that utilize selectively updating the world-state database of one or more entities within the blockchain network while maintaining data integrity and trust among entities in the blockchain network itself. Continuing trust in the blockchain network is possible because, despite entities potentially having different world-state database data/information configurations, the world-state database data/information can be regenerated using information maintained in the blocks of the blockchain. As such, blockchain networks disclosed herein can perform various auditing protocols to identify possible inconsistencies and/or nefarious peers while also minimizing the amount and type of data/information an entity's world-state database maintains.

In some embodiments, the method, system, and/or computer program product utilize a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In various embodiments, a permissioned and/or a permission-less blockchain can be used. In a public or permission-less blockchain, anyone can participate without a specific identity (e.g., retaining anonymity). Public blockchains can involve native cryptocurrency and use consensus based on various protocols such as Proof of Work. On the other hand, a permissioned blockchain database provides secure interactions among a group of entities which share a common goal, but which do not fully trust one another, such as businesses that exchange funds, goods, (private) information, and the like.

Further, in some embodiments, the method, system, and/or computer program product can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The method, system, and/or computer program product can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded.

An endorsement policy allows chaincode to specify endorsers for a transaction in the form of a set of peer nodes that are necessary for endorsement. When a client sends the transaction to the peers specified in the endorsement policy, the transaction is executed by the peers, which generate speculative transaction results. If enough peers to satisfy the endorsement policy produce identical execution results, the transaction is considered endorsed. After endorsement, the transactions enter an ordering phase in which a consensus protocol is used to produce an ordered sequence of endorsed transactions grouped into blocks. Traditionally used consensus protocols include first-in first-out (FIFO), and leader and follower protocols (e.g., Crash fault tolerance protocols).

In some embodiments, the method, system, and/or computer program product can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., orderer node).

Another type of node is a peer node which can receive ordered client submitted transactions (e.g., from ordering service), commit the transactions and maintain a state and a copy of the ledger of blockchain transactions. Peers can also have the role of an endorser, although it is not a requirement. An ordering-service-node or orderer is a node running an ordering service, which receives a stream of endorsed transactions from clients and emits a stream of ordered transactions. An ordering service node runs a communication service for all peer nodes, and implements a delivery guarantee, such as a broadcast to each of the peer nodes in the system when committing/confirming transactions and modifying a world state of the blockchain, which is another name for the initial blockchain transaction which normally includes control and setup information.

In some embodiment, the method, system, and/or computer program product can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

In some embodiment, the method, system, and/or computer program product described herein can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Blockchain is different from a traditional database in that blockchain is not a central storage, but rather a decentralized, immutable, and secure storage, where nodes may share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system described herein is implemented due to immutable accountability, security, privacy, permitted decentralization, availability of smart contracts, endorsements and accessibility that are inherent and unique to blockchain.

In particular, the blockchain ledger data is immutable and that provides for an efficient method for selectively updating one or more world-state databases in a blockchain network. Also, use of the encryption in the blockchain provides security and builds trust. The smart contract manages the state of the asset to complete the life-cycle. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set and write-set.

One of the benefits of the example embodiments is that it improves the functionality of a computing system by implementing a method for selectively updating one or more world-state databases in a blockchain network. Through the blockchain system described herein, computing system (or a processor in the computing system) can perform functionality for the selectively updating a world-state database of one or more entities within a blockchain network received from one or more client applications utilizing blockchain networks by providing access to capabilities such as distributed ledger, peers, encryption technologies, MSP, event handling, etc. Also, the blockchain enables to create a business network and make any users or organizations to on-board for participation. As such, the blockchain is not just a database. The blockchain comes with capabilities to create a network of users and on-board/off-board organizations to collaborate and execute service processes in the form of smart contracts (which may be associated with one or more assets).

The example embodiments provide numerous benefits over a traditional database. For example, through the blockchain the embodiments provide for immutable accountability, security, privacy, permitted decentralization, availability of smart contracts, endorsements and accessibility that are inherent and unique to the blockchain.

A traditional database could not be used to implement the example embodiments because it does not bring all parties on the network, it does not create trusted collaboration, and does not provide for an efficient storage of digital assets. The traditional database does not provide for a tamper proof storage and does not provide for selectively updating one or more world-state databases. As a result, the proposed embodiments described herein utilizing blockchain networks cannot be implemented in the traditional database.

If a traditional database were to be used to implement the example embodiments, the example embodiments would have suffered from unnecessary drawbacks such as search capability, lack of security and slow speed of transactions. Accordingly, the example embodiments provide for a specific solution to a problem in the arts/field of selectively updating one or more world-state databases associated with a blockchain network.

Figure 1A:
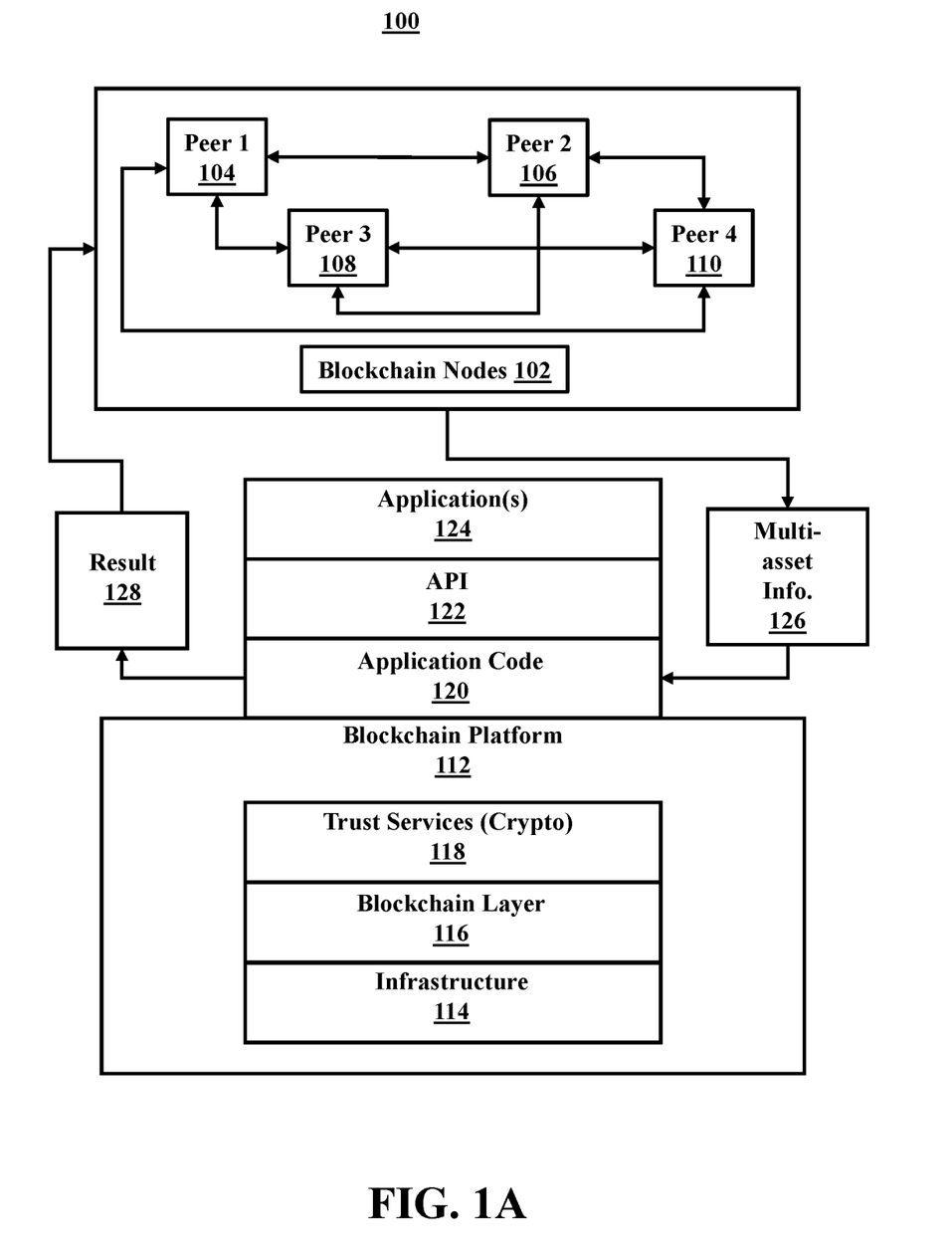
FIG. 1A illustrates an example blockchain architecture, in accordance with embodiments of the present disclosure.

Turning now to FIG. 1A, illustrated is a blockchain architecture 100, in accordance with embodiments of the present disclosure. In some embodiments, the blockchain architecture 100 may include certain blockchain elements, for example, a group of blockchain nodes 102. The blockchain nodes 102 may include one or more blockchain nodes, e.g., peers 104-110 (these four nodes are depicted by example only). These nodes participate in a number of activities, such as a blockchain transaction addition and validation process (consensus). One or more of the peers 104-110 may endorse and/or recommend transactions based on an endorsement policy and may provide an ordering service for all blockchain nodes 102 in the blockchain architecture 100. A blockchain node may initiate a blockchain authentication and seek to write to a blockchain immutable ledger stored in blockchain layer 116, a copy of which may also be stored on the underpinning physical infrastructure 114. The blockchain configuration may include one or more applications 124 which are linked to application programming interfaces (APIs) 122 to access and execute stored program/application code 120 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 104-110.

The blockchain base or platform 112 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 116 may expose an interface that provides access to the virtual execution environment necessary to process the program code and engage the physical infrastructure 114. Cryptographic trust services 118 may be used to verify transactions such as asset exchange transactions and keep information private.

The blockchain architecture 100 of FIG. 1A may process and execute program/application code 120 via one or more interfaces exposed, and services provided, by blockchain platform 112. The code 120 may control blockchain assets. For example, the code 120 can store and transfer data, and may be executed by peers 104-110 in the form of a smart contract and associated chaincode with conditions or other code elements subject to its execution. As a non-limiting example, smart contracts may be created to execute the transfer of resources, the generation of resources, etc. The smart contracts can themselves be used to identify rules associated with authorization and access requirements and usage of the ledger. For example, the group transaction information 126 may be processed by one or more processing entities (e.g., virtual machines) included in the blockchain layer 116. The result 128 may include a plurality of linked shared documents (e.g., with each linked shared document recording the issuance of a smart contract in regard to the group transaction information 126, etc.). The physical infrastructure 114 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details (e.g., thus confirming the group of transactions, identifying a conflict between one or more of the transactions in the group of transactions, etc.).

Figure 1B:
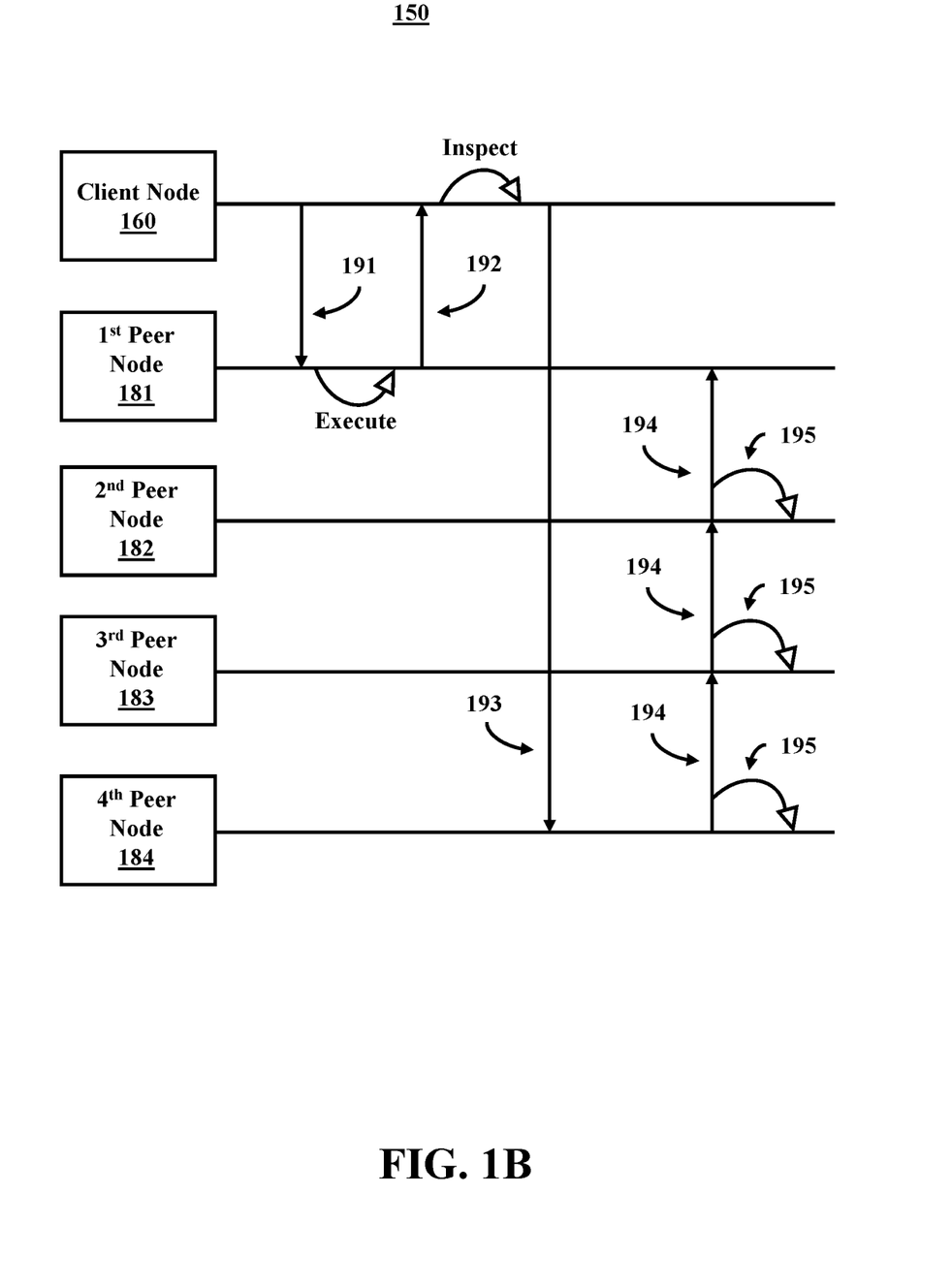
FIG. 1B illustrates a blockchain transactional flow, in accordance with embodiments of the present disclosure.

FIG. 1B illustrates an example of a conventional blockchain transactional flow 150 between nodes of the blockchain in accordance with an example embodiment. Referring to FIG. 1B, the transaction flow may include a transaction proposal 191 sent by an application client node 160 to one or more endorsing peer nodes 181 (e.g., in some embodiments, the transaction proposal 191 may be a transaction verification request and/or a conflict verification request). The endorsing peer 181 may verify the client signature and execute a chaincode function to initiate the transaction. The output may include the chaincode results, a set of key/value versions that were read in the chaincode (read set), and the set of keys/values that were written in chaincode (write set). The proposal response 192 is sent back to the client 160 along with an endorsement signature, if approved. The client 160 assembles the endorsements into a transaction payload 193 and broadcasts it to an ordering service node 184. The ordering service node 184 then delivers ordered transactions as blocks to all peers 181-183 on a channel. Before committal to the blockchain, each peer 181-183 may validate the transaction. For example, the peers may check the endorsement policy to ensure that the correct allotment of the specified peers have signed the results and authenticated the signatures against the transaction payload 193.

Referring again to FIG. 1B, the client node 160 initiates the transaction 191 by constructing and sending a request to the peer node 181, which is an endorser. The client 160 may include an application leveraging a supported software development kit (SDK), which utilizes an available API to generate a transaction proposal 191. The proposal is a request to invoke a chaincode function so that data can be read and/or written to the ledger (e.g., write new key value pairs for the assets). The SDK may reduce the package of the transaction proposal 191 into a properly architected format (e.g., protocol buffer over a remote procedure call (RPC)) and take the client's cryptographic credentials to produce a unique signature for the transaction proposal 191.

In response, the endorsing peer node 181 may verify (a) that the transaction proposal 191 is well formed, (b) the transaction has not been submitted already in the past (replay-attack protection), (c) the signature is valid, and (d) that the submitter (client 160, in the example) is properly authorized to perform the proposed operation on that channel. The endorsing peer node 181 may take the transaction proposal 191 inputs as arguments to the invoked chaincode function. The chaincode is then executed against a current state database to produce transaction results including a response value, read-set, and write-set. However, no updates are made to the ledger at this point. In some embodiments, the set of values, along with the endorsing peer node's 181 signature is passed back as a proposal response 192 to the SDK of the client 160 which parses the payload for the application to consume.

In response, the application of the client 160 inspects/verifies the endorsing peers' signatures and compares the proposal responses to determine if the proposal response is the same. If the chaincode only queried the ledger, the application would inspect the query response and would typically not submit the transaction to the ordering node service 184. If the client application intends to submit the transaction to the ordering node service 184 to update the ledger, the application determines if the specified endorsement policy has been fulfilled before submitting (e.g., has a transaction verification request been accepted). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 193 the client 160 assembles endorsements into a transaction and broadcasts the transaction proposal 191 and response within a transaction message to the ordering node 184. The transaction may contain the read/write sets, the endorsing peers' signatures and a channel ID. The ordering node 184 does not need to inspect the entire content of a transaction in order to perform its operation, instead the ordering node 184 may simply receive transactions from all channels in the network, order them by channel, and create blocks of transactions per channel.

The blocks of the transaction are delivered from the ordering node 184 to all peer nodes 181-183 on the channel. The transactions 194 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 195 each peer node 181-183 appends the block to the channel's chain, and for each valid transaction the write sets are committed to current state database. An event is emitted, to notify the client application that the transaction (invocation) has been immutably appended to the chain, as well as to notify whether the transaction was validated or invalidated. Validated transaction and their associated values update the blockchain ledger, while invalidated transactions are committed but the invalidated transaction values do not update the blockchain ledger.

Figure 2:
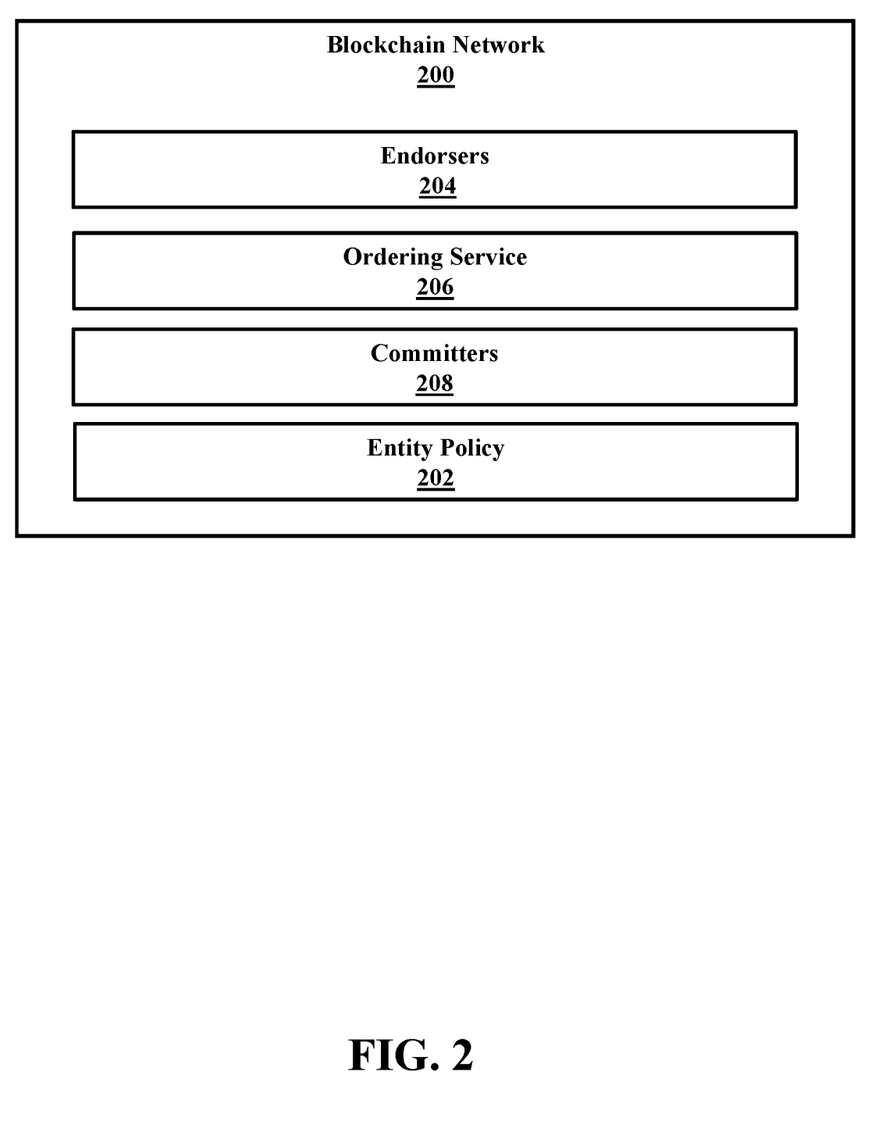
FIG. 2 depicts an example blockchain network configured to selectively update one or more world-state databases, in accordance with embodiments of the present disclosure.

Turning to FIG. 2, illustrated is an example blockchain network 200 for selectively updating a world-state database of a particular entity. As discussed herein, by reducing the amount of data/information stored on the one or more world-state databases in blockchain network 200 can increase blockchain efficiency by minimizing/reducing the number of, and need for large databases. While embodiments disclosed herein often refer to the blockchain network 200 as a permissioned blockchain consortium (e.g., Hyperledger Fabric blockchain network), blockchain network 200 can be configured to work within any type of blockchain consortium (e.g., permissionless blockchain) having peer nodes or nodes providing similar role functions. In embodiments, blockchain network 200 can include one or more entities (e.g., a particular entity and/or any other entity) configured to perform blockchain functions and entity policy 202. Each of the one or more entities maintained in blockchain network 200 can include one or more nodes, such as endorsers 204, ordering service 206, committers 208, or any combination thereof. For example, in some embodiments, an entity can include endorsers 204 and committers 208 while in other embodiments, an entity can be configured to include only committers 208.

In embodiments, one or more entities within blockchain network 200 can be configured by entity policy 202. In embodiments, entity policy 202 can include one or more world-state rules. A world-state rule can define what relevant information is, and if the relevant information should be included in the world-state databases associated with each entity within blockchain network 200. While in some embodiments, one or more world-state rules define whether the data/information should be added (e.g., updated) to the particular world-state database (e.g., if the data/information is considered relevant information), in other embodiments, world-state rules can also define when relevant information is updated to the particular world-state database. For example, in embodiments where data/information is rarely accessed, entity policy 202 can have one or more world-state rules that define that the world-state database should only be accessed after a particular duration has occurred (e.g., the value is updated once a day, or after every $100^{th}$ transaction). Such embodiments could reduce the amount of resources assigned to updating world-state databases (e.g., processing resources and database storage resources) while also maintaining some form of updated value.

In embodiments, relevant information can have different definitions depending on the setting. In other words, what is considered relevant information depends on the role or function a particular entity and/or node plays in blockchain network 200. Often, what is relevant to a particular entity may or may not be relevant to a different/other/separate/second/etc. entity. As such, entity policy 202 can further include one set of one or more world-state rules associated with a particular entity and a different set of world-state rules associated with a different/other entity that define what is considered relevant information for the different/other entity. In embodiments where the entity and/or node performs functions that are necessary for maintaining blockchain network 200, entity policy 202 can include world-state rules that identify world-state database information, critical to performing that particular blockchain function, as relevant information that must be maintained (e.g., endorsers performing endorsement functions). While in some embodiments, entity policy 202 can label entities or nodes that require compete world-state databases, with an indicator defining that each entity and/or node should receive all the data/information necessary to keep the world-state database current, in other embodiments, entity policy 202 only applies to entities and/or nodes that are configuring their respective world-state databases to include only relevant data. By selecting only data that is required or relevant to an entity and/or node (e.g., selectively updating the world-state databases to include only relevant information) can significantly reduce the amount of data an entity and/or node must store. As such, blockchain network 200 can become more efficient not only by reducing the number of updating operations, but also by reducing the amount of space needed by particular entities (e.g., comprised of nodes).

In embodiments, a particular entity in blockchain network 200 can maintain one or more world-state databases having different relevant information (e.g., entity having more than one committer nodes) than the relevant information associated with one or more world-state databases of a different/other entity (e.g., entities having endorser nodes). In these embodiments, entity policy 202 can allow an entity, and/or individual nodes within the entity, to define one or more world-state rules. Such embodiments can allow an entity, and/or nodes housed within the entity, to define what it considers relevant information and should be included in the world-state databases without having to also maintain and store information that is irrelevant to that particular entity. As such, databases associated with selectively (e.g., via entity policy 202) updating the world-state database of the particular entity can utilize pertinent databases to store relevant information and can reduce storage space traditionally occupied with irrelevant data/information. As a result of minimizing the storage space associated with these pertinent databases, blockchain network 200 can increase efficiency by minimizing and/or reducing complex operations, particularly those associated with heavy transactions or transactions that are frequently updated.

While in some embodiments, entity policy 202 can be applied generally to a particular entity and similarly applied to all of the nodes (e.g., committers) within a particular entity, in other embodiments, entity policy 202 can include world-state rules that apply to some nodes (e.g., committers) and not other nodes (e.g., endorsers) within the same particular entity. In these embodiments, entity policy 202 can be configured to have one or more world-state rules defining different relevant information for different nodes within the particular entity. In these embodiments, entity policy 202 can apply world-state rules disparately depending on the role of the node (e.g., if the node is an endorser or committer). For example, if the role of the node is to perform a key blockchain function, entity policy 202 can include one or more world-state rules that can further identify information critical to performing that particular blockchain function, as relevant information that must be maintained (e.g., endorsers performing endorsement functions) within the node's local world-state database. In embodiments, entity policy 202 can further include world-state rules regarding how definitions, associated with data/information the relevant information consists of, can be modified throughout the life of blockchain network 200. For example, entity policy 202 can define relevant information, associated with a particular entity, as car rental information, but if the particular entity evolves into selling cars, entity policy 202 can be updated to reflect this new definition of relevant information.

In embodiments, once entity policy 202 has defined the relevant information associated with a particular entity, that should be included in the entity's world-state database, blockchain network 200 can begin selectively updating the one or more world-state databases in blockchain network 200 as needed. In embodiments, blockchain network 200 can receive one or more smart contracts. In some embodiments, smart contracts can pertain to one or more entities within blockchain network 200 and can include information that can be used to update the world-state database. In these embodiments, blockchain network 200 can process the smart contract as dictated by the particular blockchain configuration and the smart contract itself, to selectively update, based at least in part on entity policy 202, the one or more world-state databases in a blockchain network. For example, while entity policy 202 can define relevant information for a different/other entity as A, B, and C information, entity policy 202 can alternatively define relevant information for a particular entity as having B and C information and not the A information (e.g., missing world-state component). In some embodiments, information that is prevented from being updated (e.g., information that is not considered relevant information) can be referred to as missing world-state component.

In some embodiments, selectively updating a world-state database can further include blockchain network 200, using entity policy 202, to determine if the smart contract is associated with the particular entity. If blockchain network 200 is determined to be associated with the particular entity, blockchain network 200 can be configured to identify from entity policy 202 one or more world-state rules associated with the particular entity. In these embodiments, the one or more world-state rules can be applied to the data/information contained in the smart contract to determine the relevant information. In these embodiments, the one or more world-state rules ensure that only relevant information and not all the information is added (e.g., updated) to the particular entity's or node's world-state database to complete the selective update to include the relevant information, by updating (e.g., writing) the new value (e.g., as defined by the smart contract) to the world-state database of the particular entity or node.

In embodiments, blockchain network 200 can be configured to retain a copy of the blockchain key and value set associated with the particular entity to ensure, if need be, that a complete world-state database of can be regenerated (e.g., if blockchain network 200 needs to perform auditing functions). These embodiments can also allow for a clear record to be maintained regarding what information has been processed by blockchain network 200 without requiring entities to store the information in their respective local world-state databases. In embodiments, some blockchain network 200 functions, (e.g., auditing functions) can require missing world-state components or data that was not updated/included in local world-state databases of a particular entity and/or node. In these embodiments, blockchain network 200 can determining the world-state database of the particular entity is missing at least one world-state component. While in some embodiments, blockchain network 200 can be configured to identifying which world-state component is missing and then, using information previously committed into blocks in the blockchain, blockchain network 200 can fill in the missing world-state component, in other embodiments an blockchain network 200 can perform this function by reviewing the retained blockchain key and value set copy. In embodiments, where all world-state databases within blockchain network 200 are required to be updated, a particular function (e.g., UpdateAllWorldState) can be called by blockchain network 200 (e.g., by an administrator or auditor of blockchain network 200, or other blockchain node depending on the blockchain configuration).

While the following example embodiments reference blockchain network 200 as having one or more components traditionally associated with a Hyperledger Fabric configuration, as stated herein, blockchain network 200 can include any blockchain consortium. In an example embodiment, blockchain network 200 can be configured to include one or more particular entities including one or more committers 208 (e.g., committer nodes) and one or more different/other entities having one or more endorsers 204 (e.g., endorser nodes), and an ordering service 206. As is discussed herein, endorsers, due to their endorsing activity during the endorsement phase, require a complete local world-state database in order to produce accurate read sets and write sets. In embodiments, ordering services 206 is generally not impacted by entity policies 202.

In embodiments, entities having at least one committer 208 can be configured by entity policy 202 to have one or more world-state rules. In general, most committers 208 are responsible for committing blocks of transactions to the blockchain and do not need data/information that is not relevant to the entity the committer belongs to in its local world-state database. As such, one or more world-state rules can apply to all committers within a particular entity, or each committer can have different world-state rules applied. These embodiments can reduce the number of redundant copies of relevant information within a particular entity. For example, in some embodiments, relevant information stored within one node can be different from another node within a particular entity. In these embodiments, blockchain network 200 and/or the particular entity can determine that having an extra copy of the data is superfluous.

In embodiments where the one or more committer nodes 206 is associated (e.g., house within) a particular entity that is governed by entity policy 202, the world-state rules applied to one or more committers 208 associated with a particular entity can validate the keys and versions of the relevant information (e.g., from the read-set). While in some embodiments, this validation is performed before committers 208 update the transaction and commit the block to the blockchain, in other embodiments, committers 208 can perform this validation after the transactions and blocks are committed to the blockchain. In embodiments, once committers 208 validate the keys and version sets and/or applies the world-state rules to the data to include relevant information, committers 208 (e.g., configured by entity policy 202) selectively write the relevant information to the local world-state databases associated with committers 208.

Figure 3:
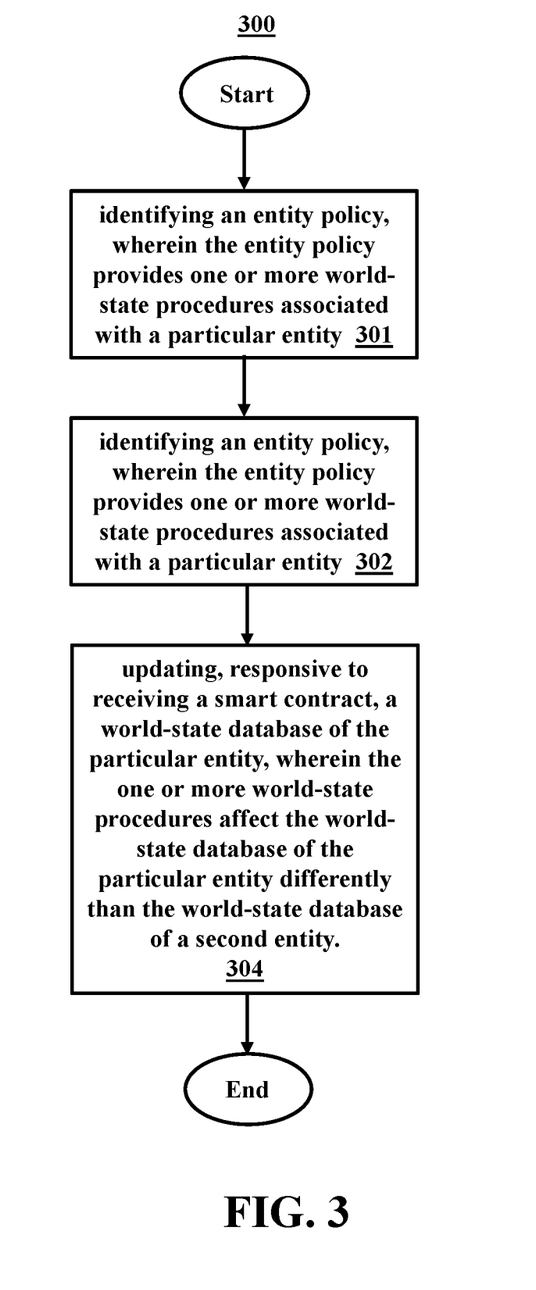
FIG. 3 illustrates a flowchart of an example method for configuring a blockchain network to selectively update a world-state database, in accordance with embodiments of the present disclosure.

Referring now to FIG. 3, a flowchart illustrating an example method 300 for selectively updating one or more world-state databases in a blockchain network, in accordance with embodiments of the present disclosure. In some embodiments, the method 300 may be performed by one or more peer nodes within the blockchain network (e.g., blockchain network 200). In some embodiments, the method 300 begins at operation 301 where the processor receives a request for a smart contract. In some embodiments, the method 300 proceeds to operation 302 where the processor generates an entity policy. The entity policy provides one or more world-state rules associated with a particular entity. In some embodiments, the method 300 proceeds to operation 304 where the processor updates, responsive to receiving a smart contract, a world-state database of the particular entity, wherein the one or more world-state rules affect the world-state database of the particular entity differently than the world-state database of a second entity.

In some embodiments, as depicted, after operation 304, the method 300 may end.

In some embodiments, discussed below, there are one or more operations of the method 300 not depicted for the sake of brevity with operations/steps further performed by the processor.

In embodiments, responsive to receiving a smart contract, the processor may determine, using the entity policy, if the smart contract is associated with a particular entity. In embodiments, the processor may identify the one or more world-state rules associated with the particular entity. The processor may then apply the one or more world-state rules and the smart contract to the world-state database of the particular entity.

In embodiments, the processor may determine relevant information from the smart contract based on the one or more world-state rules. In these embodiments, the process or may update the world-state database of the particular entity to include the relevant information. In embodiments, the processor may retain a copy of a blockchain key and value set, wherein each, the world-state database of the particular entity and the world-state database of the second entity, retain the copy of the blockchain key value set.

In embodiments, the processor may select the relevant information. In these embodiments, the relevant information may be dictated by the entity policy and the one or more world-state rules. In these embodiments, the processor may identify a value specific to the relevant information and write the value to the world-state database of the particular entity.

In embodiments, the processor may determine the world-state database of the particular entity is missing at least one world-state component. In these embodiments, the processor may identify the at least one world-state component that is missing. In these embodiments, the processor may fill in the at least one world-state component that is missing using one or more blocks committed to the blockchain network.

In embodiments, the processor may determine (e.g., via the entity policy 202) that the particular entity has at least one committer node and the other entity has at least one endorser node.

In embodiments, the processor may configure the entity policy to exempt the at least one endorser node from the one or more world-state rules.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an entity. It may be managed by the entity or a third party and may exist on-premises or off-premises.

Community cloud: the cloud infrastructure is shared by several entities and supports a specific community that has shared concerns (e.g., mission, security requirements, policy, and compliance considerations). It may be managed by the entities or a third party and may exist on-premises or off-premises.

Public cloud: the cloud infrastructure is made available to the general public or a large industry group and is owned by an entity selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4A:
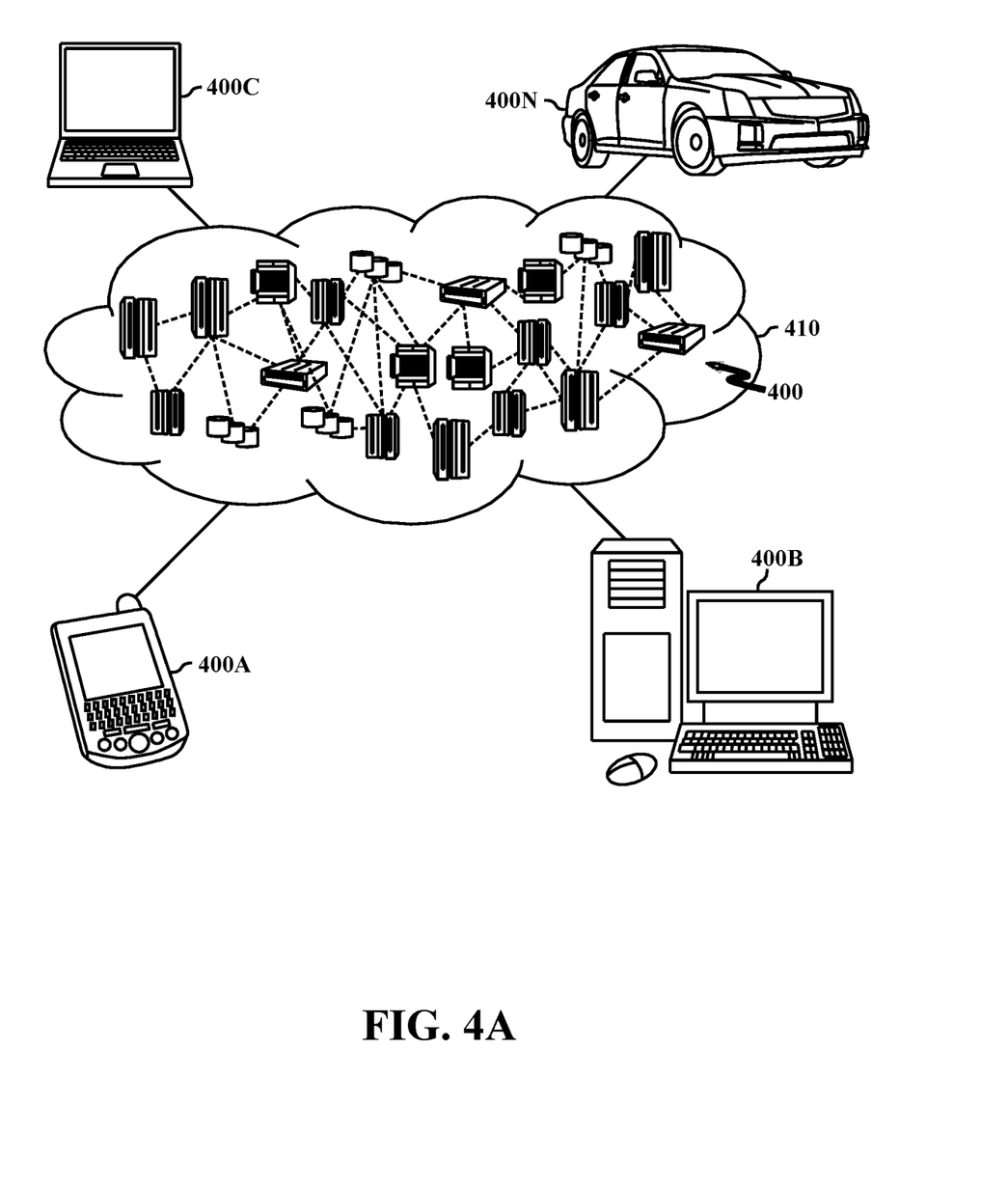
FIG. 4A illustrates a cloud computing environment, in accordance with embodiments of the present disclosure.

FIG. 4A, illustrated is a cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4A are intended to be illustrative only and that computing nodes 400 and cloud computing environment 410 can communicate with any type of computerized device over any type of network and/or network addressable connection (e.g., using a web browser).

Figure 4B:
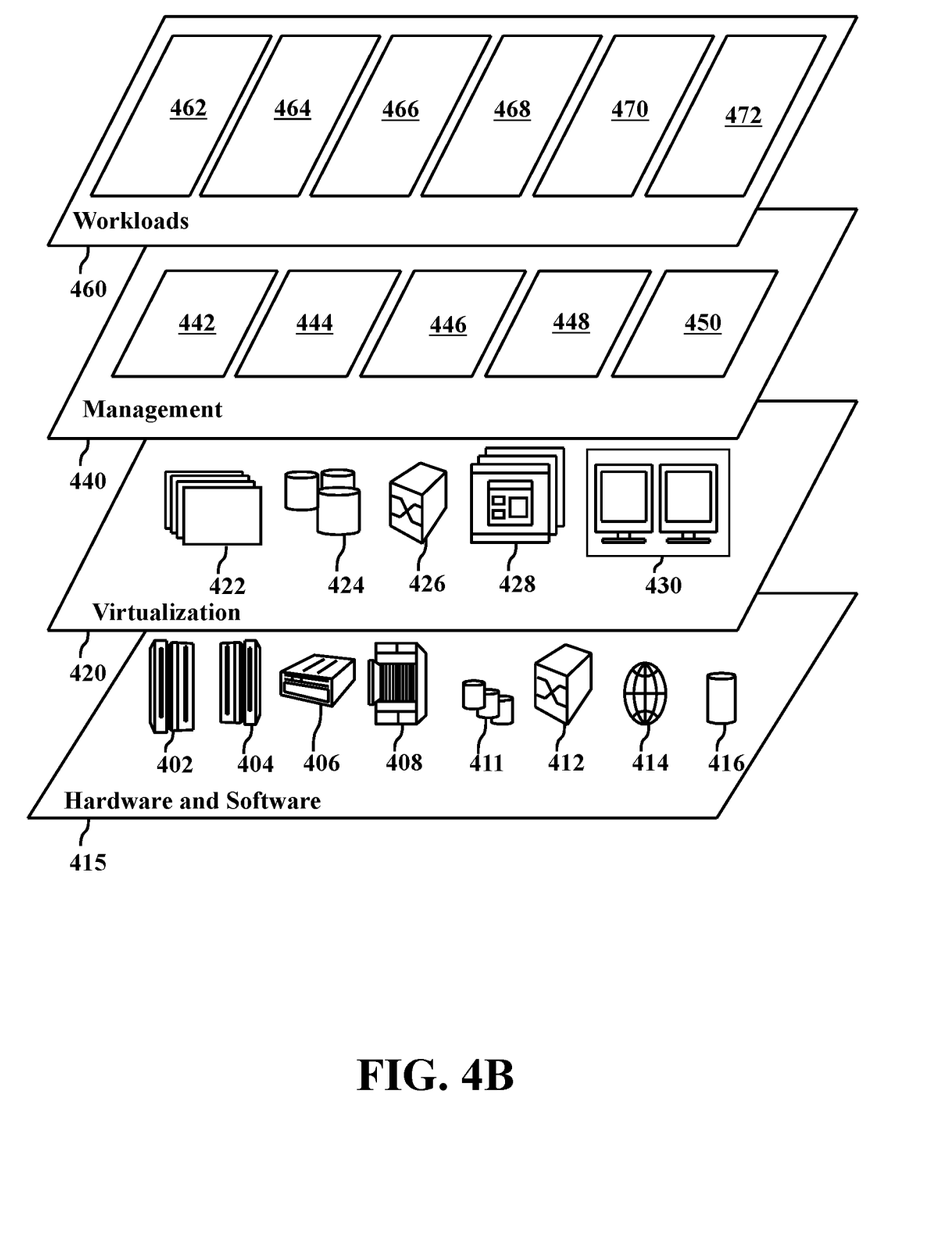
FIG. 4B illustrates abstraction model layers, in accordance with embodiments of the present disclosure.

FIG. 4B, illustrated is a set of functional abstraction layers provided by cloud computing environment 410 (FIG. 4A) is shown. It should be understood in advance that the components, layers, and functions shown in FIG. 4B are intended to be illustrative only and embodiments of the disclosure are not limited thereto. As depicted below, the following layers and corresponding functions are provided.

Hardware and software layer 415 includes hardware and software components. Examples of hardware components include: mainframes 402; RISC (Reduced Instruction Set Computer) architecture based servers 404; servers 406; blade servers 408; storage devices 411; and networks and networking components 412. In some embodiments, software components include network application server software 414 and database software 416.

Virtualization layer 420 provides an abstraction layer from which the following examples of virtual entities may be provided: virtual servers 422; virtual storage 424; virtual networks 426, including virtual private networks; virtual applications and operating systems 428; and virtual clients 430.

In one example, management layer 440 may provide the functions described below. Resource provisioning 442 provides dynamic procurement of computing resources and other resources that are utilized to perform tasks within the cloud computing environment. Metering and Pricing 444 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 446 provides access to the cloud computing environment for consumers and system administrators. Service level management 448 provides cloud computing resource allocation and management such that required service levels are met. Service Level Agreement (SLA) planning and fulfillment 450 provide pre-arrangement for, and procurement of, cloud computing resources for which a future requirement is anticipated in accordance with an SLA.

Workloads layer 460 provides examples of functionality for which the cloud computing environment may be utilized. Examples of workloads and functions which may be provided from this layer include: mapping and navigation 462; software development and lifecycle management 464; virtual classroom education delivery 466; data analytics processing 468; transaction processing 470; and selectively updating one or more world-state databases 472.

Figure 5:
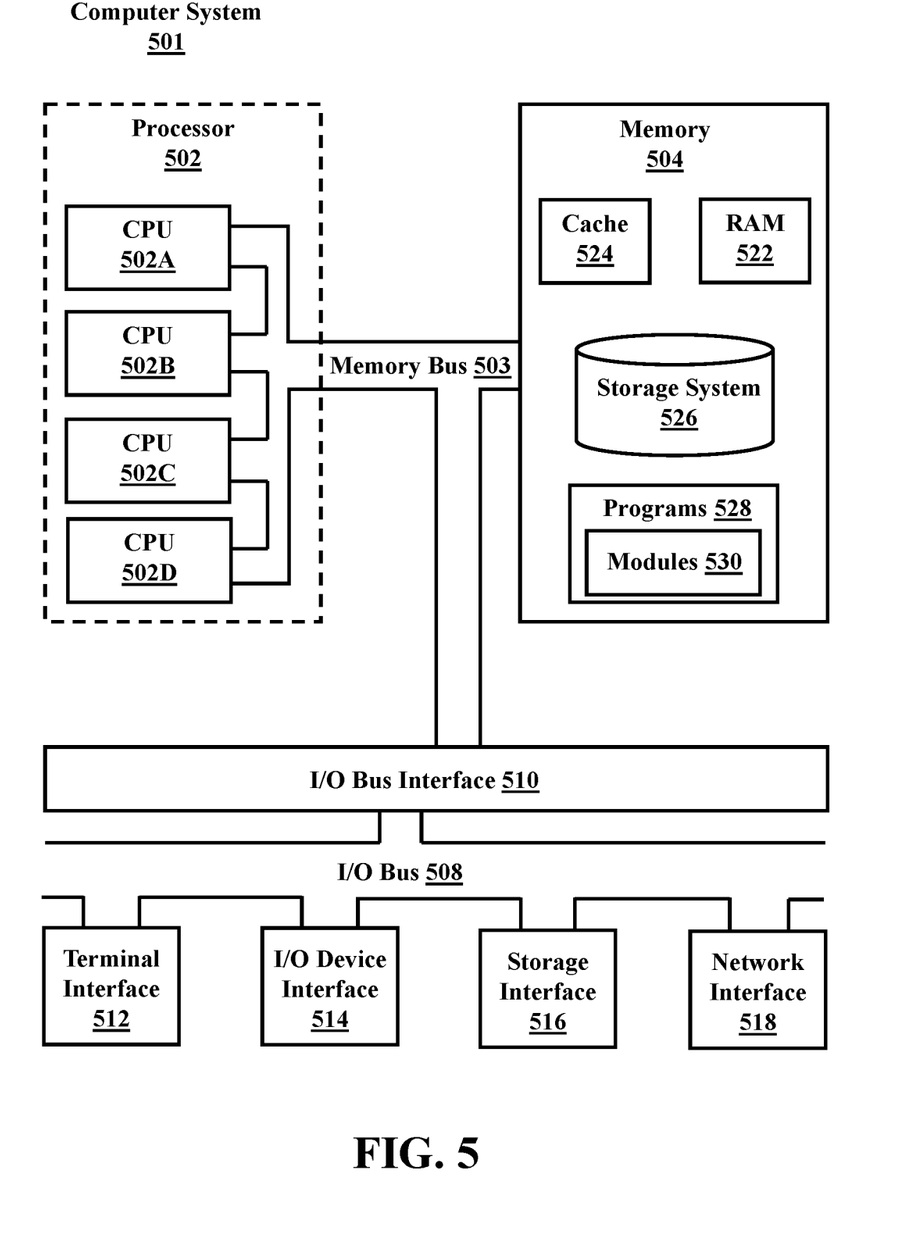
FIG. 5 illustrates a high-level block diagram of an example computer system that may be used in implementing one or more of the methods, tools, and modules, and any related functions, described herein, in accordance with embodiments of the present disclosure.

FIG. 5, illustrated is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for selectively updating one or more world-state databases in a blockchain network, comprising:
   receiving, by a processor, a request for a smart contract;
   identifying an entity policy having one or more world-state rules associated with the one or more world-state database in the blockchain network;
   determining a relevant information from the smart contract based on the one or more world-state rules;
   applying the one or more world-state rules to one or more committers; and
   updating, responsive to receiving the smart contract, a world-state database of the one or more committers with the relevant information, wherein the one or more world-state rules affect the world-state database of the one or more committers differently than the world-state database of one or more endorsers.

2. The method of claim 1, wherein updating, responsive to receiving the smart contract, the world-state database of the one or more committers further includes:
   determining, using the entity policy, if the smart contract is associated with the one or more committers;
   identifying the one or more world-state rules associated with the one or more committers; and
   applying the one or more world-state rules and the smart contract to the world-state database of the one or more committers.

3. The method of claim 1, further comprising:
   selecting the relevant information, wherein the relevant information is dictated by the entity policy and the one or more world-state rules;
   identifying a value specific to the relevant information; and
   writing the value to the world-state database of the one or more committers.

4. The method of claim 1, further comprising:
   retaining a copy of a blockchain key and value set, wherein the world-state database of the one or more committers and the world-state database of the one or more endorsers retain the copy of the blockchain key value set.

5. The method of claim 1, further comprising:
   determining the world-state database of the one or more committers is missing at least one world-state component;
   identifying the at least one world-state component that is missing; and filling in the at least one world-state component that is missing using one or more blocks committed to the blockchain network.

6. The method of claim 1, wherein the entity policy exempts the at least one endorser node of the one or more endorsers from the one or more world-state rules.

7. A system for selectively updating one or more world-state databases in a blockchain network, the system comprising:
a memory; and
a processor in communication with the memory, the processor being configured to perform operations comprising:
receiving a request for a smart contract;
identifying an entity policy having one or more world-state rules associated with the one or more world-state database in the blockchain network;
determining a relevant information from the smart contract based on the one or more world-state rules;
applying the one or more world-state rules to one or more committers; and
updating, responsive to receiving the smart contract, a world-state database of the one or more committers with the relevant information, wherein the one or more world-state rules affect the world-state database of the one or more committers differently than the world-state database of one or more endorsers.

8. The system of claim 7, wherein updating, responsive to receiving the smart contract, the world-state database of the one or more committers further includes:
determining, using the entity policy, if the smart contract is associated with the one or more committers;
identifying the one or more world-state rules associated with the one or more committers; and
applying the one or more world-state rules and the smart contract to the world-state database of the one or more committers.

9. The system of claim 7, the processor being further configured to perform operations comprising:
selecting the relevant information, wherein the relevant information is dictated by the entity policy and the one or more world-state rules;
identifying a value specific to the relevant information; and
writing the value to the world-state database of the one or more committers.

10. The system of claim 7, the processor being further configured to perform operations comprising:
retaining a copy of a blockchain key and value set, wherein the world-state database of the one or more committers and the world-state database of the one or more endorsers retain the copy of the blockchain key value set.

11. The system of claim 7, the processor being further configured to perform operations comprising:
determining the world-state database of the one or more committers is missing at least one world-state component;
identifying the at least one world-state component that is missing; and
filling in the at least one world-state component that is missing using one or more blocks committed to the blockchain network.

12. The system of claim 7, wherein the entity policy exempts the at least one endorser node of the one or more endorsers from the one or more world-state rules.

13. A computer program product for selectively updating one or more world-state databases in a blockchain network, the computer program product comprising a computer readable storage medium having program instructions embodied therewith, the program instructions executable by a processor to cause the processors to perform a function, the function comprising:
receiving, by a processor, a request for a smart contract;
identifying an entity policy having one or more world-state rules associated with the one or more world-state database in the blockchain network;
determining a relevant information from the smart contract based on the one or more world-state rules;
applying the one or more world-state rules to one or more committers; and
updating, responsive to receiving the smart contract, a world-state database of the one or more committers with the relevant information, wherein the one or more world-state rules affect the world-state database of the one or more committers differently than the world-state database of one or more endorsers.

14. The computer program product of claim 13, wherein updating, responsive to receiving the smart contract, the world-state database of the one or more committers further includes:
determining, using the entity policy, if the smart contract is associated with the one or more committers;
identifying the one or more world-state rules associated with the one or more committers; and
applying the one or more world-state rules and the smart contract to the world-state database of the one or more committers.

15. The computer program product of claim 13, the processor being further configured to perform operations comprising:
selecting the relevant information, wherein the relevant information is dictated by the entity policy and the one or more world-state rules;
identifying a value specific to the relevant information; and
writing the value to the world-state database of the one or more committers.

16. The computer program product of claim 13, the processor being further configured to perform operations comprising:
determining the world-state database of the one or more committers js missing at least one world-state component;
identifying the at least one world-state component that is missing; and
filling in the at least one world-state component that is missing using one or more blocks committed to the blockchain network.

17. The computer program product of claim 13, wherein the entity policy exempts the at least one endorser node of the one or more endorsers from the one or more world-state rules.

* * * * *